United States Patent [19]

Parker et al.

[11] 4,032,300

[45] June 28, 1977

[54] OXYGEN-CONTAINING GAS DISTRIBUTION APPARATUS EMPLOYED IN FLUIDIZED BED REGENERATION OF CARBON-CONTAMINATED CATALYSTS

[75] Inventors: Wesley A. Parker; John E. Gwyn; Glenn R. McCullough, all of Pasadena, Tex.

[73] Assignee: Shell Oil Company, Houston, Tex.

[22] Filed: Apr. 9, 1976

[21] Appl. No.: 675,419

Related U.S. Application Data

[60] Division of Ser. No. 574,188, May 5, 1975, Pat. No. 3,974,091, which is a continuation-in-part of Ser. No. 501,514, Aug. 29, 1974, abandoned.

[52] U.S. Cl. .......................... 23/288 B; 23/288 S;
23/284; 252/417; 252/419; 34/57 A; 208/163;
208/164; 423/659 F; 239/556; 239/558;
239/601
[51] Int. Cl.² ..................... B01V 8/24; B01V 23/90
[58] Field of Search ............. 23/288 S, 288 B, 284;
423/659 F; 252/41 T, 419; 208/163, 164;
34/57 A; 239/601, 558, 556, 550

[56] References Cited

UNITED STATES PATENTS

| | | | |
|---|---|---|---|
| 2,798,030 | 7/1957 | Hettick et al. | 23/288 S X |
| 3,053,642 | 9/1962 | Huntley et al. | 23/284 X |
| 3,309,784 | 3/1967 | Adams | 34/57 A |
| 3,912,460 | 10/1975 | McGann | 23/288 B |

Primary Examiner—James H. Tayman, Jr.
Attorney, Agent, or Firm—Dean F. Vance

[57] ABSTRACT

An oxygen-containing gas distribution apparatus is dicslosed which can be employed in the fluidized bed regeneraton of carbon-contaminated catalysts, such as cracking catalysts. Said apparatus comprises a plurality of gas discharge nozzles affixed to at least one manifold member substantially horizontally disposed at the lower end of the regeneration chamber, said nozzles being restricted in internal cross-sectional area in their upstream portion connected to the manifold member and expanded in the internal cross-sectional area of their downstream portion such that a) the numerical ratio of the difference between the diameter of the downstream portion and the diameter of the upstream portion divided by the length of the downstream portion taken in the direction of gas flow does not exceed 0.18 and b) the ratio of the diameter of the upstream portion to its length taken in direction of gas flow does not exceed 1.67.

4 Claims, 4 Drawing Figures

OXYGEN-CONTAINING GAS DISTRIBUTION APPARATUS EMPLOYED IN FLUIDIZED BED REGENERATION OF CARBON-CONTAMINATED CATALYSTS

This application is a division Ser. No. 574,188 of U.S. Pat. No. 3,974,091, filed May 5, 1975, which is a continuation-in-part of application U.S. Ser. No. 501,514, filed Aug. 29, 1974, now abandoned.

BACKGROUND OF THE INVENTION

This invention relates to the regeneration of fine particulate catalysts which have become temporarily deactivated by the deposition of carbonaceous material on utilization in hydrocarbon conversion processes such as catalytic cracking. More particularly, this invention is directed to an improved fluidized bed regeneration process and apparatus for a carbon-contaminated catalyst by which catalyst particle attrition is reduced when at least a portion of the oxygen-containing gas required for catalyst fluidization and carbon burn-off is introduced by means of a plurality of gas discharge nozzles into the dense phase of the fluidized catalyst bed.

In a number of high temperature catalytic hydrocarbon process e.g., cracking, hydroforming, etc., catalysts which are employed in finely-divided or powder form become contaminated with carbonaceous deposits during contact with the hydrocarbon reactants in the conversion zone. These carbonaceous deposits which accumulate on the surfaces of the catalyst particles during the conversion process can, and do, substantially reduce the activity of, or even deactivate, the catalyst. It is common practice especially in continuous processes for catalytic cracking of heavy hydrocarbons, where the particle size of the spent catalyst admits, to regenerate the catalyst by continuously passing it from the catalytic conversion zone into a regeneration zone where sufficient oxygen-containing gas is introduced under controlled conditions to fluidize the catalyst particles and burn-off a substantial portion of the carbonaceous material deposited thereon. Typically, in such processes the carbon-contaminated catalyst is introduced into the regeneration zone or chamber as a fluidized mass with a portion of the oxygen-containing gas required for regeneration or an inert gas, e.g., nitrogen, being the fluidizing medium or as a solid phase via gravity feed or other suitable mechanical transporting means. In any case, the catalyst particles on entering the regeneration chamber form a dense zone or phase at the lower end of the chamber where catalyst particles and gas interact as a single mass which simulates a liquid and an upper less dense phase in which the catalyst is merely suspended in the gases or vapors. Conventionally, the simulated liquid behavior (fluidized state) of the lower dense phase is imparted and/or maintained by an oxygen-containing gas distribution system comprising one or more manifold members of various shapes, usually substantialy horizontally oriented at the bottom portion of the chamber and connected to an outside source of pressurized oxygen-containing gas, each manifold member having a plurality of gas discharge ports through which oxygen-containing gas is introduced at a flow rate sufficient to maintain the fluidized or liquid behavior of the dense catalyst phase. Depending on the amount of oxygen-containing gas utilized to transport the spent catalyst particles into the regeneration chamber, the oxygen-containing gas introduced via gas discharge nozzles into the dense phase of the catalyst bed at the lower end of the regeneration chamber will also supply all or part of the oxygen required to combust a substantial portion of the carbon present on the incoming spent catalyst.

After contacting the oxygen-containing gas at a temperature and residence time sufficient to burn-off a substantial portion of the carbonaceous deposits on the catalyst particles, the catalyst is withdrawn from the regeneration chamber by means of one or more conduits typically located at or near the top of the dense phase and returned to the conversion zone. The spent regeneration gas containing the gaseous combustion products and entrained catalyst particles from the dilute catalyst phase is passed through a conventional solids gas separation scheme, e.g., one or more cyclone separators, to remove the catalyst particles which are returned to the dense phase with the residual gases being discharged to the atmosphere via a waste gas stack.

While the fluidized bed regeneration process described generally above or various modifications thereof have been employed on a broad scale commercially for a number of years such processes are not devoid of problems. One difficulty which continues to plague operators of such regeneration processes, especially in the catalytic cracking area, is the significant attrition of catalyst particles which appears to occur during the regeneration process. The particle size (diameter) of catalysts employed in catalytic cracking typically ranges from about 5 to about $125\mu$ (microns) with the major portion of the catalyst particles being in the 45 to $74\mu$ range. Catalyst particles in this particle size range can be and are essentially confined in the system as the finer particles, i.e., catalyst particles in the $5–40\mu$ range which remain entrained in the gas phase of the regeneration chamber are effectively recovered by known gas-solids separation techniques e.g., one or more cyclone (centrifugal) separators located at the top or downstream of the regeneration chamber. The problem lies in the fact that a significant quantity of the catalyst charged to the fluidized regeneration zone is attrited to particles in the less than $5\mu$ range under the conditions which exist in conventional regeneration processes. These less than $5\mu$ attrition products are too fine to be effectively recovered by conventional cyclonic gas-solids separation systems; and consequently, represent a source of catalyst loss in the system as well as causng atmospheric pollution problems in furnace stacks associated with catalytic cracking units, unless expensive scrubbing or precipitating systems are employed. Accordingly, it would be very desirable from both economic and environmental standpoints if the source of this catalyst attrition could be substantially eliminated at its source, i.e., the regeneration zone itself.

DESCRIPTION OF THE PRIOR ART

Recognition has been given to the fact that a predominant source of catalyst or solid particle attrition in fluidized bed operation derives from the high-velocity gas imput at the fluidizing gas distribution nozzles, e.g., see U.S. Pat. No. 3,053,642 to Huntley et al and U.S. Pat. No. 3,298,793 to Mallison et al. In U.S. Pat. No. 3,053,642, which utilizes a plurality of fluidizing gas distribution nozzles spaced at different vertical levels on the upper surface of an inverted double cone grid distributor, it is indicated that the gas distribution nozzles may have a larger internal opening for gas flow than the opening in the grid plate to allow the gases to expand to a lower linear velocity before they enter the fluid solids bed so as to prevent a high rate of catalyst attrition. However, with the specialized gas distribution system described, the nozzle pressure drop constraints associated with uniform gas distribution to all the nozzles in a conventional horizontally-disposed gas grid or diaphram are substantially eliminated since the gas openings in the grid are purposely varied in size at different vertical levels on the cone to allow more or less gas flow depending on fluidized bed height.

U.S. Pat. No. 3,298,793 is directed to reduction of catalyst attrition in fluidized beds wherein the fluidizing gas introduced in a more conventional manner via equal-sized gas orifices uniformly spaced on a grid or gas sparger manifold which is horizontally disposed at the lower end of the fluidizing zone. In this case, catalyst attrition is attributed to collisions between fast-moving catalyst particles picked up by high-velocity gas jetting from the grid or sparger outlets and the comparatively slower-moving catalyst particles in the fluidized mass surrounding the gas outlets; the high-gas jet velocity being associated with the need to maintain equal and high pressure drop at the gas outlets for even gas distribution in such a system. As a solution to such catalyst attrition, this patent proposes that the fluidizing gas passing through the grid or sparger orifices at high velocity and pressure drop be expanded and reduced in velocity before it contacts the catalyst particles in the bed while shielding and isolating the gas flow from the fluidized catalyst as it is expanded and reduced in velocity. By shielding and isolating the gas flow entering the grid or sparger perforations and reducing its velocity in the manner described, it is taught that catalyst attrition can be reduced to a small fraction of that commonly encountered while avoiding catalyst backflow into the grid or sparger orifices. According to more specific teachings in this patent, the desired reduction in catalyst attrition in a fluidized bed can be obtained by protecting (shielding) the entering gas jet in the catalyst bed until its velocity is reduced to a level below about 50 feet per second, preferably 10 to 30 feet per second, from inlet bed velocities of 140 feet per second or more. Thus, while the means for reducing catalyst attrition described in this reference may have application in certain fluidized bed processes, it is not desirable, on its face, for many fluidized bed operations such as the regeneration of carbon-contaminated cracking catalysts wherein much higher, e.g., 75 feet per second or more, gas discharge nozzle velocities are desirable for satisfactory bed fluidization and carbon burn-off rates.

SUMMARY OF THE INVENTION

It has now been found that the catalyst attrition associated with the conventional fluidized bed regeneration of carbon-contaminated catalysts can be substantially reduced in cases where at least a portion of the oxygen-containing gas required for fluidization and burn-off of carbon deposits is introduced directly into the dense phase of the fluidized catalyst by means of a plurality of gas discharge nozzles affixed to one or more manifold members substantially horizontally disposed at the lower end of the fluidized bed regeneration zone. Furthermore, it has been found that this reduction in catalyst attrition can be achieved while maintaining sufficient pressure drop in the nozzles to provide uniform gas distribution to the regeneration zone and to prevent catalyst particle backflow and erosion of nozzles, even though the gas discharge nozzles are in direct fluid communication with the fluidized catalyst particles. These beneficial results derive from the utilization of critically dimensioned gas discharge nozzles which are restricted in internal cross-sectional area in their upstream portion connected to the manifold member and expanded in the internal cross-sectional area of their downstream portion in fluid communication with the fluidized catalyst particles, said nozzle dimensions being set such that a) the numerical ratio of the difference between the internal diameter of the downstream portion and the internal diameter of the upstream portion divided by the length of the downstream portion taken in the direction of gas flow does not exceed 0.18 and b) the ratio of the internal diameter of the upstream portion to its length taken in direction of gas flow does not exceed 1.67.

Accordingly, the invention is directed to an improved oxygen-containing gas distribution apparatus for introduction of at least a portion of the oxygen-containing gas required for fluidization and burn-off of carbon deposits of a fluidized bed of carbon-contaminated hydrocarbon conversion catalyst contained in a regeneration chamber, said gas distribution system being made up of one or more manifold members substantially horizontally disposed at the lower end of said regeneration chamber in fluid communication with a source of pressured oxygen-containing gas and having connected thereto in fluid communication a plurality of gas discharge nozzles through which oxygen-containing gas is passed into contact with the dense catalyst phase, characterized in that each gas discharge nozzle is restricted in internal cross-sectional area in its upstream portion connected to the manifold member and expanded in the internal cross-sectional area of its downstream portion such that a) the numerical ratio of the difference between diameter of the downstream portion and the diameter of the upstream portion divided by the length of the downstream portion taken in the direction of gas flow does not exceed 0.18 and b) the ratio of the internal diameter of the upstream portion to its length taken in direction of gas flow does not exceed 1.67.

Additionally, it has been found when the critically dimensioned gas discharge nozzles are employed in the manner described in a process for fluidized bed regeneration of carbon-contaminated cracking catalysts that the most substantial reduction of catalyst attrition to particles in the less than $2\mu$ range occurs when the gas velocity at the nozzle outlets is reduced to a velocity in the range of 75–125 feet per second from velocities in excess of 150 feet per second. This substantial reduction in catalyst attrition with the instant gas discharge nozzles occurs at a nozzle outlet velocity substantially above the less than 50 feet per second velocity limit previously disclosed for acceptable catalyst attrition and, as a consequence, catalyst attrition can now be reduced in fluidized bed operations such as that employed in regeneration of carbon-contaminated cracking catalysts wherein nozzle outlet velocities above 75 feet per second are desirable for acceptable fluidization and burn-off of carbon deposits. Accordingly, another aspect of the instant invention is directed to an improved process for fluidized bed regeneration of carbon-contaminated catalysts wherein at least a portion of the oxygen-containing gas required for fluidization and burn-off of carbon deposited on the catalyst particles is introduced as a separate stream into the dense phase of the fluidized catalyst bed contained in a regeneration chamber by means of a plurality of gas discharge nozzles connected to an external source of pressurized oxygen-containing gas by one or more horizontally disposed manifold members; the improvement which comprises, introducing the oxygen-containing gas via the critically dimensioned gas discharge nozzles described above, such that the nozzle outlet gas velocities are in the range of from 75 to 125 feet per second.

DETAILED DESCRIPTION OF THE INVENTION

Figure 1:
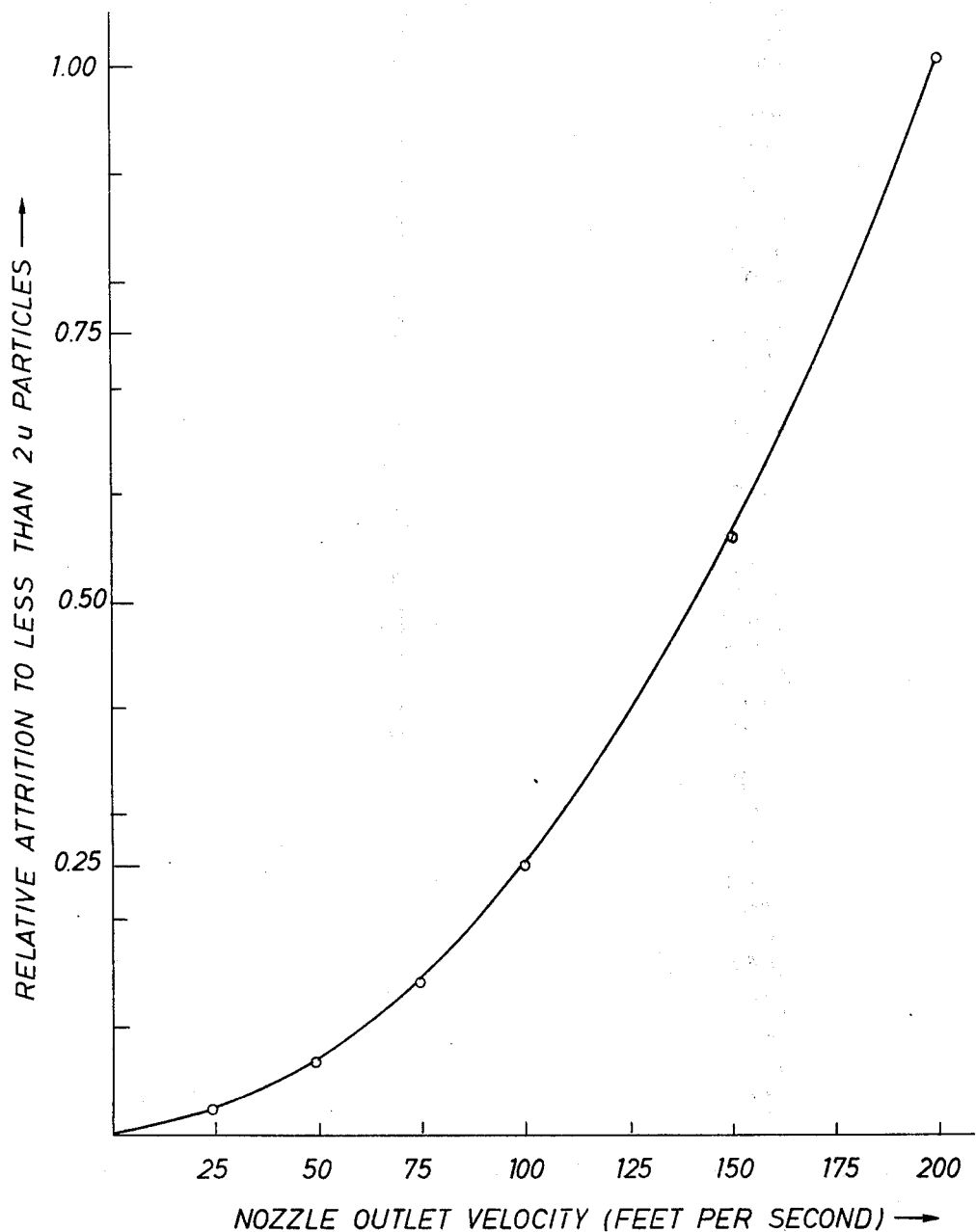

The invention is applicable to any fluidized bed wherein a gas is introduced into the dense or simulated liquid phase of solid particles to maintain the particles in a fluidized state, e.g., hydroforming, cracking, polymerization, hydrogenation, dehydrogenation, etc. However, primarily because of the rate and severity of deactivation of hydrocarbon cracking catalysts due to carbon deposition and the broad scale use of continuous cracking processes employing fluidized cracking catalysts, the invention is particularly suited to regeneration of such fluidized cracking catalysts.

In the fluidized bed regeneration of cracking catalysts, the benefits according to the invention, i.e., reduced catalyst attrition, can be obtained in any conventional regeneration chamber where spent catalyst is introduced as, or forms on introduction, a dense or simulated liquid phase; the only essential requirement being that at least a portion of the oxygen-containing gas required to induce or maintain fluidization of the catalyst particles and burn-off of the carbon deposits be introduced as a separate stream directly into the dense catalyst phase via a plurality of gas distribution nozzles connected to a source of pressurized oxygen-containing gas by one or more manifold members substantially horizontally disposed at the lower end of the regeneration zone. The choice of regeneration chamber construction is wholly conventional; that is, the chamber may be vertically oriented such as an upright cylinder having a reduced diameter or conical shape at its lower end or merely an upright cone with the base of the cone forming the top of the regeneration chamber. Further, if desired, the regeneration chamber may be a horizontal or slightly inclined elongated chamber with suitable baffling provided to regulate the flow of fluidized catalyst particles. Preferably, the regeneration chamber is in the form of an upright cylinder having a reduced diameter or conical shape at its lower end. The spent catalyst from the catalytic cracking zone may be introduced into the regeneration chamber in any conventional manner — i.e., as a dense or dilute fluidized phase with a portion of the oxygen-containing gas or an inert gas such as nitrogen being the fluidizing medium or as a solid phase via gravity feed or other suitable mechanical transporting means. Typically, the spent catalyst is introduced into the bottom or lower portion of the regeneration chamber via a gas riser or lift pipe. In any case, including those where the spent catalyst is introduced into the regeneration chamber as a fluidized mass in an oxygen-containing gas fluidizing medium, it is preferred that the major portion of the oxygen-containing gas required for fluidization and burn-off of carbon deposits be introduced as a separate stream directly into the dense phase of the fluidized catalyst mass in the regeneration chamber by means of the gas discharge ports or nozzles according to the invention.

The gas discharge nozzles utilized to introduce the oxygen-containing gas into the dense phase of the fluidized catalyst particles according to the instant invention are disposed in the regeneration chamber in a manner essentially identical to the positioning of the gas discharge nozzles in conventional regeneration units. That is, the gas discharge nozzles are positioned on, and in fluid communication with, one or more oxygen-containing gas carrying manifold members, said manifold members being substantially horizontally disposed in the lower end of the regeneration chamber such that a substantial portion of the fluidized dense catalyst phase is positioned above the manifold members. These manifold members, which are connected to, and in fluid communication with, an external source of pressurized oxygen-containing gas, may have anyone of a variety of conventional shapes. For example, they may be circular in shape such as a plurality of concentric rings of varying circumference or of serpentine configuration or even straight tubes. In this regard, the substantially horizontal orientation of the manifold members in the regeneration chamber is taken to mean that each individual manifold member possesses this orientation even though the combination of manifold members comprising the total gas distribution system may be at different horizontal levels relative to one another in the chamber, i.e., a series of concentric rings in stacked configuration. With this limitation on the configuration of the individual manifold members, uniform gas distribution in the fluidized bed is still based on the existence of a uniform pressure drop at the nozzle inlets of any given manifold since all the nozzles in a given manifold are dependent on a common gas source passing through the manifold inlet. There is no criticality in the positioning and orientation of the gas discharge nozzles according to the invention on the manifold members. That is, the discharge nozzles may point upward into the regeneration chamber, downward, sideways or any combination thereof. It is preferred in order to avoid gas flow channel formation and to insure uniformity of gas distribution into the fluidized bed that the gas discharge nozzles be spaced equally apart and be of equal diameter.

As indicated previously, the essence of the instant invention lies in the unique configuration of the oxygen-containing gas distribution nozzles utilized to introduce at least a portion of the oxygen-containing gas as a separate stream directly into the dense phase of the fluidized catalyst bed contained in the regeneration chamber. The configuration of these gas discharge nozzles is based to a certain degree on the general concepts previously employed to reduce attrition in fluidized beds in that the nozzles are restricted in internal cross-sectional areas of their upstream portions connected to the manifold member and expanded in internal cross-sectional area of their downstream portions in fluid communication with the fluidized catalyst particles. However, with the instant invention certain critical dimensions have been found for gas discharge nozzles of this general configuration which afford substantial reductions in fluidized bed catalyst attrition, even though the nozzle outlet is in direct fluid communication with the dense phase of the catalyst bed, i.e., the fluidizing gas expansion in the nozzle is not isolated and shielded from the catalyst particles as in U.S. Pat No. 3,298,793. Furthermore, these critical nozzle dimensions are such that the gas discharge nozzles of the invention can be employed with conventional horizontally disposed manifold members to afford substantial reductions in catalyst attrition at nozzle discharge velocities required in large scale operations such as conventional regeneration of carbon-contaminated cracking catalysts, e.g., nozzle outlet velocities in the range of 75 to 125 feet per second, while at the same time providing sufficient nozzle pressure drop that uniform gas distribution to the catalyst bed is assured and catalyst backflow and concomitant erosion of nozzles is avoided. According to the invention it is especially critical that the gas discharge nozzles, which are typically cylindrical or substantially cylindrical in shape, be dimensioned such that the numerical ratio of the difference between the internal diameter of the downstream portion and the internal diameter of the upstream portion divided by the length of the downstream portion taken in direction of gas flow does not exceed 0.18. The criticality of this ratio of nozzle dimensions is demonstrated by the experimental data given below wherein it is shown that catalyst attrition to less than $2\mu$ particles in the case of cracking catalysts dramatically increases as this ratio is exceeded. For practical operation, i.e., the avoidance of exceedingly long overall nozzle lengths, it is preferred that this numerical ratio be in the range of from about 0.09 to about 0.12.

The transition between the restricted cross-sectional areas of the upstream portion and the expanded cross-sectional area of the downstream portion may be gradual or abrupt provided there is sufficient transition zone for gas flow to develop in the downstream portion of larger cross-sectional area and the dimension limits of the aforementioned critical ratio are met. Preferably, the downstream cross-sectional area is 1.3 to 5 times the upstream cross-sectional area and the transition zone is an abrupt change in area. The length taken in direction of gas flow of the upstream portion of the nozzle will be determined by the pressure drop desired in the nozzles, however, to avoid extreme sensitivity of pressure drop to length, the ratio of the internal diameter of the upstream portion to its length taken in direction of gas flow should not exceed about 1.67 for conventional size nozzles. At ratios greater than 1.67 it has been found that small changes (reductions) in the length of the upstream portion of the nozzle relative to its length can cause dramatic increases in the pressure drop over the nozzle to values which are undesirably high for optimum fluidized bed performance. By controlling the ratio of the internal diameter of the upstream nozzle portion to its length at the level described and maintaining the critical numerical ratio described above for the difference between the internal diameters of the downstream portion and the upstream portion divided by the length of the downstream portion, it is possible to significantly reduce catalyst attrition while maintaining pressure drop across the nozzles, e.g., 0.3 to about 2.0 psi, which are analogous to those required for uniform gas distribution to substantially horizontally disposed fluidizing manifolds in cases where high gas velocities (and catalyst attrition rates) were previously required for uniform gas distribution.

In typical commercial scale fluidized bed regeneration of carbon-contaminated cracking catalysts the mass flow rate of oxygen-containing gas through the gas discharge nozzles is set by the coke or carbon burning requirements. Further, at any given mass flow rate the downstream cross-sectional area of the nozzle according to the invention will determine the discharge velocity from the nozzles and the upstream cross-sectional area and length will set the pressure drop across the nozzle. Accordingly, given the above-mentioned criteria for design of the so-called two-stage nozzles according to the invention, one skilled in the art will readily be able to construct gas discharge nozzles according to the invention to suit the process parameters of any specific regeneration system. In this regard it is noted that in conventional fluidized bed regeneration of carbon-contaminated cracking catalysts, the overall length of the nozzles according to the invention can be conventional, i.e., from 3 to 5 inches with the number of individual nozzles typically employed ranging upwards to in excess of 3–4000 for larger regeneration chambers.

A preferred aspect of the instant invention is concerned specifically with an improved process for fluidized bed regeneration of carbon-contaminated cracking catalysts whereby attrition of the catalyst particles to less than $2\mu$ size particles can be substantially reduced while maintaining sufficient fluidizing gas velocity at the nozzle outlets such that satisfactory carbon burn-off and fluidization is obtained in conventional sized reactors. This improved process combines the utilization of the oxygen-containing gas distribution system of the invention, including the critically dimensioned gas discharge nozzles, with a determination that catalyst attrition to the less than $2\mu$ particles in the system described is directly proportional to the kinetic energy imput at the nozzle outlets rather than nozzle outlet velocity itself or some other related factor. Thus, attrition becomes directly dependent on the square of the nozzle outlet velocity, and consequently, in the case of cracking catalyst regeneration, a range of nozzle outlet velocities exist which afford a substantial reduction in catalyst attrition while at the same time being high enough that acceptable catalyst fluidization is achieved. This relationship between kinetic energy imput and catalyst attrition is illustrated in FIG. 1 which plots cracking catalyst attrition to less than $2\mu$ particles against fluidizing gas nozzle outlet velocity from a base attrition of one (1.00), attributable to a velocity of 200 feet per second. As can be seen from FIG. 1, the greatest increase in catalyst attrition as experienced when the nozzle outlet velocities are increased from velocities in the 75–125 ft/sec range to the 200 ft/sec limit. Thus, reducing velocity from 200 ft/sec to velocities in the range of from about 75 to about 125 ft/sec reduces attrition caused by the jet by 86 to 60%, whereas further reduction in velocity from 75 ft/sec to velocities previously employed (less than 50 ft/sec) gives only an additional 10% or so reduction in attrition. Translated into practical terms this means that by far the largest reduction in quantity of attrited catalyst particles emitted from the vent of a cracking catalyst regeneration chamber can be obtained by reducing the nozzle velocities to the degree and in the manner described. Accordingly, the invention also contemplates an improved process for fluidized bed regeneration of carbon-contaminated catalysts wherein at least a portion of the oxygen-containing gas required for fluidization and burn-off of carbon deposited on the catalyst particles is introduced as a separate stream into the dense phase of the fluidized catalyst bed contained in a regeneration chamber by means of a plurality of gas discharge nozzles connected to an external source of pressurized oxygen-containing gas by one or more horizontally disposed manifold members; the improvement which comprises, introducing the oxygen-containing gas at a nozzle outlet velocity in the range of about 75 to about 125 ft/sec via gas discharge nozzles which are restricted in internal cross-sectional area in their upstream portions connected to the manifold member and expanded in the internal cross-sectional area of their downstream portions such that a) the numerical ratio of the difference between diameter of the downstream portion and the diameter of the upstream portion divided by the length of the downstream portion taken in the direction of gas flow does not exceed 0.18 and b) the ratio of the internal diameter of the upstream portion to its length taken in direction of gas flow does not exceed 1.67.

Since the overall regeneration process and apparatus in which the improvement according to the invention is applied is well known to those skilled in the art, they need not be detailed herein. Regeneration process parameters such as temperature, pressure, bed density and residence time and means for their control are all conventional and depend to a large degree on the specific type of catalyst to be regenerated, the extent of coking and like factors. Typically, the oxygen-containing gas introduced into the dense phase of the fluidized bed via the improved gas discharge nozzles of the invention is air or oxygen-enriched air. However, the use of less concentrated oxygen sources, e.g., air diluted, with a non-combustion supporting gas such as nitrogen or flue gas, or even the use of pure oxygen is not precluded.

Figure 2:
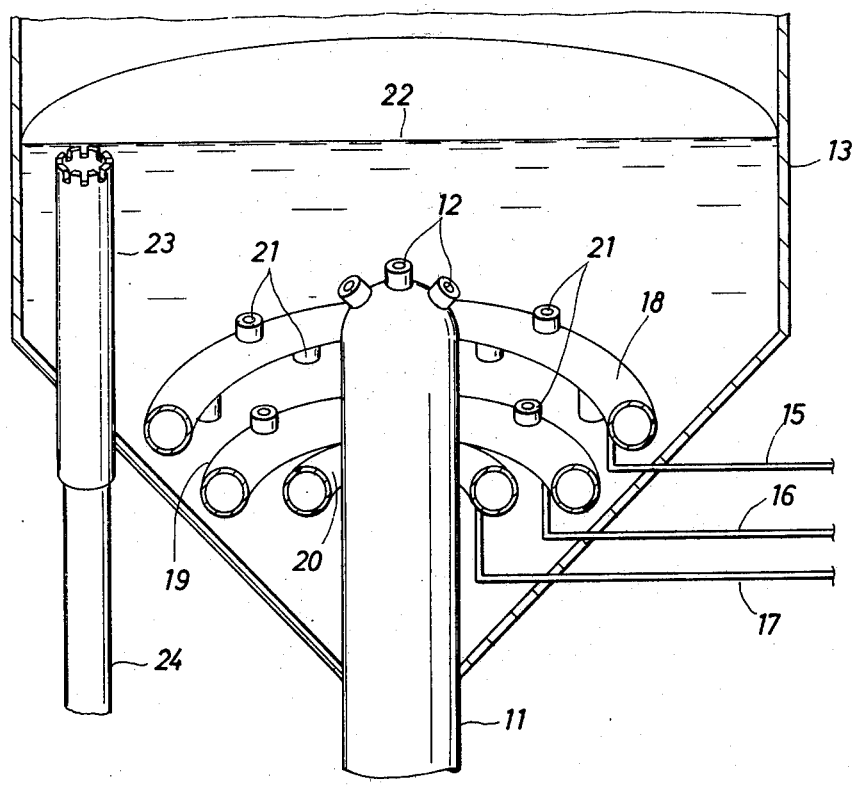
Figure 3:
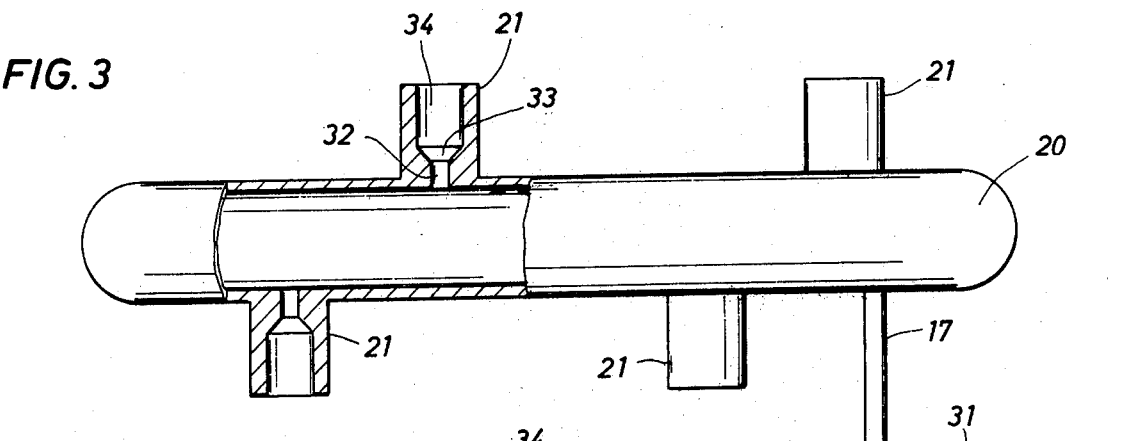
Figure 4:
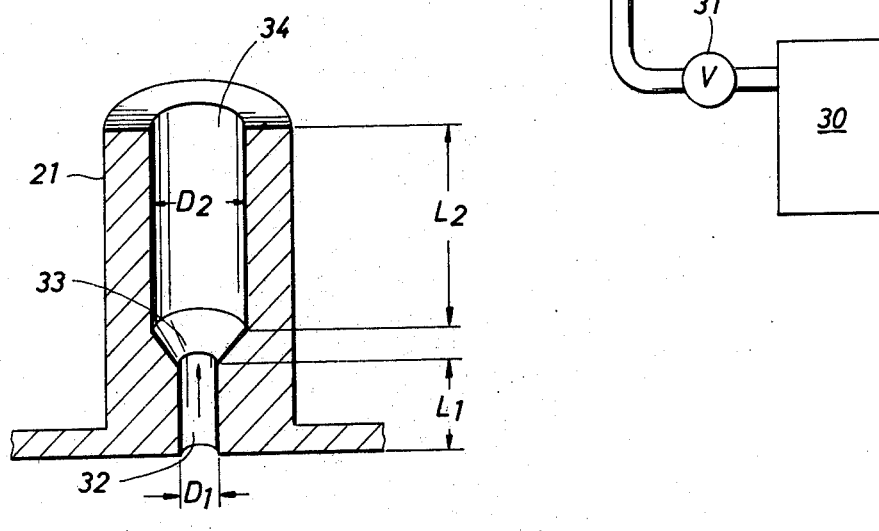

The invention will now be further elucidated with reference to the drawings. FIG. 2 is a diagrammatic representation taken in partial cross-section of the lower portion of a regeneration chamber suitable for use in the invention. FIG. 3 is a diagrammatic representation also taken in partial cross-section of an oxygen-containing gas carrying manifold member equipped with gas discharge nozzles according to the invention. FIG. 4 is a cross-sectional view showing an enlarged scale of an embodiment of the gas discharge nozzle according to the invention.

Referring to FIG. 2, spent fluidized bed cracking catalyst contaminated with carbon deposits from the cracking unit (not shown) is introduced in fluidized form via a spent catalyst riser 11 equipped with catalyst distribution nozzles 12 into the dense fluidized catalyst phase contained in lower portion of the conical shaped regeneration chamber 13. The fluidizing medium and driving force for transporting the spent catalyst in the riser can be either a portion of the oxygen-containing gas required for regeneration (usually 20–50% of the oxygen-containing gas required for regeneration) or an inert gas such as nitrogen. This transporting gas is introduced into the riser tube at some point (not shown) between the regeneration chamber 13 and the cracking unit. Oxygen-containing gas is also introduced as a separate stream into the dense phase of the fluidized catalyst contained in the regeneration chamber 13 (top of the dense phase being designated by the number 22 in the instant illustration) from a source of pressurized oxygen-containing gas (not shown) via lines 15, 16, 17 into a plurality of gas carrying manifolds 18, 19 and 20 in the shape of horizontally disposed concentric rings, said gas carrying manifolds being equipped with a plurality of the gas discharge nozzles 21 according to the invention which are in fluid communication with the manifolds at their upstream ends and release a flow of oxygen-containing gas at their downstream ends directly into the dense phase of the fluidized catalyst bed. The gas discharge nozzles of uniform size are spaced uniformly apart on the manifold members and direct the flow of oxygen-containing gas both upward into the dense phase of the fluidized bed and downward towards the restricted end of the conical shaped regeneration chamber also containing a portion of the dense catalyst phase. In this manner uniform fluidization and carbon burn-off of the catalyst particles contained in the dense phase is obtained. the dense phase of the fluidized catalyst contained in the regeneration chamber is maintained at a constant level 22 above an overflow well 23 which is connected to the return line 24 which recycles regenerated catalyst as a dense phase to the cracking unit.

In FIG. 3, one of the concentric, circular shaped manifolds 20 shown in FIG. 2 is detailed to show the improved oxygen-containing gas distribution system of the invention wherein the manifold 20 is equipped with a plurality of gas discharge nozzles 21. In this Figure, oxygen-containing gas from a source of pressurized gas 30 is introduced via line 17 equipped with suitable valving means 31 into the circular shaped manifold 20. From the circular shaped manifold 20 the gas passes through a plurality of gas discharge nozzles 21 according to the invention. In passing through the gas discharge nozzles 21, the gas passes directly from the manifold member into the upstream section of the nozzle 32 which is restricted in internal cross-sectional area relative to the downstream portion 34 of the nozzle. Each discharge nozzle is sized to have the critical dimensions according to the invention which are detailed below with reference to FIG. 4.

In FIG. 4 an expanded version of a substantially cylindrically shaped gas discharge nozzle 21 is shown. In this illustration the oxygen-containing gas stream from the gas carrying manifold member (not shown) passes as designated by the arrow into the upstream portion of the gas discharge nozzle 32 of restricted internal cross-sectional area having an internal cross-sectional diameter $D_1$ and a length taken in direction of gas flow of $L_1$. The gas then passes through the transition zone 33 into the downstream portion of the discharge nozzle 34 having an expanded internal cross-sectional area of diameter $D_2$, and length taken in direction of gas flow of $L_2$. In this illustration the critical dimensions according to the invention are satisfied since the numerical ratio of $L_1/D_1$ exceeds 0.6 and the numerical ratio of $D_2-D_1/L_2$ is less than 0.18.

The following example illustrates the criticality of the above dimensional limits on cracking catalyst attrition with the gas discharge nozzles of the invention.

EXAMPLE

A laboratory scale attrition apparatus was employed in a series of tests with conventional equilibrium catalytic cracking catalyst to demonstrate the effect of gas discharge nozzle dimensions on cracking catalyst attrition at a constant mass flow of air. This apparatus included a cylindrical fluidizing chamber with an inverted cone bottom (total volume of 56 gallons) which was loaded with equilibrium cracking catalyst (about 9 gallons) to a settled level coinciding with the top of the inverted cone portion of the chamber. Fluidizing air was introduced at the bottom of the chamber via a removable test nozzle mounted on the bottom of the chamber with its discharge end pointing up in direct fluid communication with the catalyst. Air was supplied to the test nozzle at a constant measured rate (26.46 or 36.02 lbs/hr) from a source of pressurized air. The jet issuing from the test nozzle was sufficient to cause measurable attrition of catalyst. The amount of attrition was determined by measuring the rate at which less than $2\mu$ attrition products are elutriated from the catalyst bed into a cyclone-filter collection system located on fluidizing chamber overhead discharge line. Several different plastic test nozzles which were restricted in internal diameter in their upstream portions and expanded in internal diameter in their downstream portions were tested for catalyst attrition according to the following procedure. Firstly, the nozzle as fabricated was tested for rate of attrition in the test apparatus. The nozzle was then removed and its downstream length ($L_2$) reduced and this modified nozzle was tested. This procedure was continued until a point where a further reduction in downstream nozzle length adversely effected catalyst attrition. The effect on catalyst attrition to less than $2\mu$ particles of changing the numerical value for the ratio $D_2-D_1/L_2$ ($D_1$ being the upstream internal nozzle diameter and $D_2$ the downstream internal diameter) is shown in the tables below for various test nozzles. The conditions for each test are given in the table subheadings.

TABLE I

Air flow = 36.02 lbs/hr., Upstream nozzle length ($L_1$) = 1", Upstream diameter ($D_1$) = 3/16", Downstream diameter ($D_2$) = ⅜" Gas Velocity basis $D_1$ = 620 ft/sec, Gas Velocity basis $D_2$ = 155 ft/sec.

| Downstream Nozzle length ($L_2$) in inches | Numerical Ratio $\dfrac{D_2 - D_1}{L_2}$ | Attrition Rate to less than $2\mu$ particles (g/hr on Filter) |
|---|---|---|
| 1½ | 0.125 | 0.15 |
| 1¼ | 0.150 | 0.18 |
| 1⅛ | 0.167 | 0.17 |
| 1.0 | 0.188 | 0.19 |
| ⅞ | 0.214 | 1.23 |
| Recheck with second nozzle (same conditions) | | |
| 1 1/16 | 0.177 | 0.20 |
| 15/16 | 0.200 | 0.63 |

TABLE II

Air flow = 36.02 lbs/hr., Upstream length ($L_1$) = 1", Upstream Diameter ($D_1$) = 0.173", Downstream Diameter ($D_2$) = 9/32", Gas velocity basis $D_1$ = 720 ft/sec., Gas velocity basis $D_2$ = 270 ft/sec.

| Downstream Nozzle Length ($L_2$) in inches | Numerical Ratio $\dfrac{D_2 - D_1}{L_2}$ | Attrition Rate to less than $2\mu$ particles (g/hr on filter) |
|---|---|---|
| 15/16 | 0.116 | 0.44 |
| 13/16 | 0.133 | 0.44 |
| 11/16 | 0.158 | 0.39 |
| 1/2 | 0.217 | 1.66 |
| 3/8 | 0.289 | 3.42 |

Table III

Air flow = 26.46 lbs/hr, Upstream length ($L_1$) = 0.5, Upstream Diameter ($D_1$) = 0.173", Downstream Diameter ($D_2$) = 9/32", Gas velocity basis $D_1$ = 550 ft/sec, Gas velocity basis $D_2$ = 210 ft/sec.

| Downstream Nozzle Length ($L_2$) in inches | Numerical Ratio $\dfrac{D_2 - D_1}{L_2}$ | Attrition Rate to less than $2\mu$ particles (g/hr on filter) |
|---|---|---|
| 7/8 | 0.124 | 0.10 |
| 3/4 | 0.144 | 0.10 |
| 21/32 | 0.165 | 0.10 |
| 35/64 | 0.198 | 0.17 |
| 1/2 | 0.217 | 0.44 |

Table IV

Air flow = 26.46 lbs/hr, Upstream length ($L_1$) = 1", Upstream Diameter ($D_1$) = 5/32", Downstream Diameter ($D_2$) = 7/32", Gas velocity basis $D_1$ = 613 ft/sec, Gas velocity basis $D_2$ = 312 ft/sec.

| Downstream Nozzle Length ($L_2$) in inches | Numerical Ratio $\dfrac{D_2 - D_1}{L_2}$ | Attrition Rate to less than $2\mu$ particles (g/hr on filter) |
|---|---|---|
| 1 | 0.063 | 0.45 |
| 9/16 | 0.111 | 0.46 |
| 1/2 | 0.125 | 0.48 |
| 15/32 | 0.133 | 0.64 |
| 27/64 | 0.148 | 0.53 |
| 3/8 | 0.167 | 0.54 |
| 11/32 | 0.182 | 0.64 |
| 10/32 | 0.200 | 0.92 |

As can be seen from the above tables, the catalyst attrition to less than $2\mu$ particles remained essentially constant until the critical ratio of $D_2-D_1/L_2$ was reached. When this critical ratio was reached, i.e., 0.18, the amount of catalyst attrition produced by the nozzles then increased dramatically with any further small change (increase) in the ratio. This demonstrates the criticality of this dimensional ratio when the gas discharge nozzles are utilized to inject fluidizing regeneration gas directly into the catalyst bed.

What is claimed is:

1. An oxygen-containing gas distribution apparatus for introduction of at least a portion of the oxygen-containing gas required for fluidization and burn-off of carbon deposits of a fluidized bed of carbon-contaminated hydrocarbon conversion catalyst contained in a regeneration chamber, which comprises one or more manifold members substantially horizontally disposed at the lower end of said regeneration chamber in fluid communication with a source of pressured oxygen-containing gas and having connected thereto in fluid communication a plurality of gas discharge nozzles through which oxygen-containing gas is passed into contact with the dense catalyst phase, characterized in that each gas discharge nozzle is substantially cylindrical in shape having an upstream portion and a downstream portion with a transition portion connecting the upstream and downstram portions wherein said upstream portion is attached to said manifold member, which discharge nozzles are restricted in internal cross-sectional area in its upstream portion and expanded in the internal cross-sectional area of its downstream portion such that a) the numerical ratio of the difference between the diameter of the downstream portion and the diameter of the upstream portion divided by the length of the downstream portion taken in the direction of gas flow does not exceed 0.18 and b) the ratio of the internal diameter of the upstream portion to its length taken in direction of gas flow does not exceed 1.67.

2. The apparatus of claim 1, wherein the downstream cross-sectional area of the gas discharge nozzles is 1.3 to 5 times the upstream cross-sectional area.

3. An apparatus according to claim 1 wherein said manifold member is a circular ring.

4. An apparatus according to claim 1 wherein the numerical ratio of the difference between the diameter of the downstream portion and the diameter of the upstream portion divided by the length of the downstream portion take in the direction of gas flow is between about 0.09 and about 0.12.

* * * * *